Patented July 5, 1927.

1,635,026

UNITED STATES PATENT OFFICE.

RICHARD BAYBUTT AND EDWARD S. FARROW, JR., OF ROCHESTER, NEW YORK, ASSIGNORS TO EASTMAN KODAK COMPANY, OF ROCHESTER, NEW YORK, A CORPORATION OF NEW YORK.

CELLULOSE ACETATE AND PROCESS OF MAKING THE SAME.

No Drawing.   Application filed July 20, 1926. Serial No. 123,791.

This invention relates to acetone-soluble cellulose acetate having special characteristics and to processes of making the same.

One object of the invention is to produce hydrolyzed cellulose acetate which dissolves in acetone to form viscous film-forming solutions, the films made from such solutions being exceptionally strong, flexible and uniformly transparent or grainless. Another object is to provide such a cellulose acetate, the superior molecular condition of which is indicated by its novel behavior in the polariscope. Still another object is to provide a simple, inexpensive process for preparing such cellulose acetate. A further object is to provide a hydrolyzing process in which the sizes of the cellulose acetate particles under treatment are coordinated with the rate of hydrolysis. Still another object is to have present in the particles of cellulose acetate a material which facilitates the penetration of the hydrolyzing liquid into each particle without seriously degrading the product. A further object is to provide a process in which the behavior of the cellulose acetate in the polariscope is a criterion of the progress of the hydrolysis. Other objects will hereinafter appear.

Cellulose acetate, especially for film manufacture, is used in the acetone-soluble form. This has customarily been derived from the chloroform-soluble species by means of hydrolysis. The latter operation has been conducted either with the cellulose acetate in solution, as, for example, in U. S. Reissue Patent No. 12,637, Miles, April 23rd, 1907, or in solid form, as, for example, in British Patent No. 24,067, Newton, of 1906.

The degree of solubility of the cellulose acetate in acetone depends on the extent of the hydrolysis. When the mixture of water and acids for hydrolysis is stirred into the viscous reaction mass containing the chloroform-soluble cellulose acetate, as in the Miles patent cited above, it is manifest that said mixture will not contact with all parts of the cellulose acetate at the same time; but on the contrary there will be a considerable period of time before some of the parts of the mass begin to hydrolyze. The final product will, therefore, consist of portions which have been hydrolyzed to different extents. When washed and dried flakes of chloroform-soluble cellulose acetate are hydrolyzed in a dilute aqueous solution, as in the Newton patent cited above, hydrolysis begins at the surface of each flake but there is a considerable time which elapses before the hydrolyzing mixture reaches the innermost parts of each flake. Consequently the cellulose acetate at the surface of each flake will be hydrolyzed to a much further extent than the interior portions.

When films are prepared by spreading acetone solutions of hydrolyzed cellulose acetate prepared as above, the acetone evaporates and the cellulose acetate becomes more and more concentrated until it "sets." Those parts of the cellulose acetate which have acquired the greatest solubility in acetone will be the last to gelatinize, whereas those which have a smaller solubility in acetone tend to gelatinize first. In consequence the film, while being usefully transparent, nevertheless, has a certain granularity or structure due to parts of it becoming gelatinized before the other parts. It is desirable to minimize this effect in order to make the transparency more nearly perfect and in order to obtain greater strength and flexibility.

In U. S. Patent No. 1,516,225, Webb, November 18th, 1924, there is disclosed, along with other matters, the production of sprayed chloroform-soluble cellulose acetate in the form of a powder, this powder containing some of the originally associated acetic acid and some of the condensing agent, especially when a solid condensing agent is employed to facilitate the spray drying of the powder. When this powder is hydrolyzed, say by an aqueous acid solution, good film-forming acetone-soluble cellulose acetate can be produced. But in the case of powder sprayed from reaction mixtures of the usual viscosity and under the usual operating conditions, the films produced therefrom, after hydrolysis, still show to some extent the above mentioned qualities which result from unequal hydrolysis. Such qualities are much less manifest in the hydrolyzed Webb powder than in the hydrolyzed products of the Miles process and the Newton process mentioned above. Nevertheless, it is desirable to almost completely eliminate such qualities.

We have found that this can be done by coordinating reduced sizes of the particles with the rate of hydrolysis. In other words, we prepare chloroform-soluble cellulose acetate, in the form of a powder, the particles of which are so small and so penetrable by the hydrolyzing mixture that the time which the hydrolyzing mixture takes to completely penetrate to the center of each particle is negligible in comparison with the total time of the hydrolyzing operation or reaction. In general, we have found that the desired results can be obtained by hydrolyzing a chloroform-soluble cellulose acetate powder the particles of which are of the order of magnitude of 1/300th of an inch or less. For example, practically all of the particles, say about 98%, pass through a screen of standard 200 to the inch mesh. The penetration of the hydrolyzing liquid is accelerated by the presence in the particles of some of the originally associated acetic acid (say 30% to 100% of the weight of the cellulose acetate itself) and a condensing agent, particularly a solid one which is milder than sulfuric acid. We have found that suitable powders can be prepared by spray drying a reaction mixture at the proper chloroform-soluble stage, special conditions being observed to insure particles of the desired size and composition.

When the impalpable powder, thus prepared, is hydrolyzed with an aqueous acid solution, such as dilute nitric acid, for example, the hydrolyzing liquid penetrates to the interior of the particle with great rapidity, because the center of the particle is only a minute fraction of an inch from the surface and because the presence of the acetic acid and catalyst facilitates the penetration,—in other words, these ingredients serve as penetrant material. As the hydrolysis proceeds, the product becomes soluble in acetone, but as the action progresses the solubility in acetone becomes less and less. We have found that for best results hydrolysis should be carried to the point where one part by weight of the hydrolyzed powder is soluble in from 4 to 12 parts of acetone at approximately 20° C. In other words, a very viscous acetone solution should be produced when at least 7% of powder is dissolved in the acetone. With the maximum solubility, about 20% can be dissolved to form such solutions. At no time during the process is our product soluble in ethyl alcohol, either absolute or diluted with water. The same is true of the chloroform-soluble material at the start of the process and during its production.

The final hydrolyzed powder, not only can be made up into films which avoid the granularity noted above, but it possesses other properties which show that it is a new cellulose acetate, not hitherto known and possessing a very superior molecular condition. This is indicated by comparing its behavior in the polariscope with the behavior of the acetone-soluble cellulose acetates produced in accordance with the prior art. Our product, when dissolved in acetone and tested at 25° C. in a polariscope, using mercury green light, always gives a negative reading, preferably between −2 and −5. On the other hand, specimens which have been hydrolyzed while in solution, in accordance with the principle of the Miles patent, and specimens which have been hydrolyzed in the solid flaked state, in accordance with the principle of the Newton patent, and specimens obtained commercially always have given a positive rotation under parallel conditions.

Both the chloroform-soluble starting material and the acetone-soluble hydrolyzed powder are soluble in a chloroform ethyl alcohol mixture, this mixture having 85 parts by volume of the former to 15 parts by volume of the latter. Using solutions of the acetate in this solvent the progress of the reaction can be indicated in the polariscope using mercury green light and operating at 25° C. The initial chloroform-soluble powder shows a large negative specific rotation, usually in the neighborhood of −25, whereas the finished hydrolyzed powder has a negative rotation only a few degrees less,—in general the change in rotation is less than 7° and the readings on both the starting material and the final material are more negative than −18°. All the cellulose acetates hydrolyzed in solution according to Miles, or hydrolyzed in the flake form in accordance with Newton, or those now available commercially, with which we are familiar, have changed in rotation much more than 7° so as to have a final negative value much less than −18.

In the following example we shall describe one form of our invention, but it will be understood that we are not limited to the details thus given except as indicated in the appended claims. A reaction dope or mixture is first prepared containing a chloroform-soluble cellulose acetate. This may be carried out in the same way that Miles, in the patent cited above, prepares his chloroform-soluble species. As stated in Worden's "Technology of Cellulose Esters," Vol. VIII, page 2575, the sulphuric acid in Miles' mixture may be replaced by anhydrous zinc chloride as a condensing medium. See also pages 2598 to 2600 in this same book. We prefer to carry out the preparation of the chloroform-soluble acetate by using this or an equivalent condensing agent which is milder than sulphuric acid. Moreover, it has the advantage of facilitating the spray drying. Of course, the Miles mixture, employing sulphuric acid, may be used and the sulphuric acid then converted into sodium sulfate by adding sodium acetate, as indicated in U. S. Patent No. 1,514,274, Webb, November 4th, 1924. We prefer, however, to use the milder condensing agent throughout the first stage.

When a uniform flowable reaction mixture is thus prepared, and the cellulose has all been converted into chloroform-soluble cellulose acetate, it is spray dried in the apparatus discussed in Webb Patent No. 1,516,225 cited above. Precautions are taken to obtain powder of exceptionally fine grains or particles. While this can be done in several ways, such as by raising the temperature of the reaction mixture to increase its fluidity, or by increasing the spraying pressure, we have found it simple and safe to produce the necessary fluidity by adding glacial acetic acid to the dope. A convenient test, for example, is to measure the time required for a sample to flow from a 20 cc. pipet at 40° C., this instrument being calibrated so as to deliver 20 cc. of water in 5 seconds at 15° C.. When the reaction mixture or dope has the proper fluidity it takes 25 seconds at 40° C. for 20 cc. of it to run out of this instrument. But, of course, any other suitable known way of determining the fluidity will serve, and after standard operating conditions have been established these determinations need not be made.

The powder thus obtained is very fine and impalpable and is of the order of fineness mentioned hereinabove. Each particle contains a residual amount of acetic acid and a small percentage of condensing agent. This powder is then rapidly stirred into a hydrolyzing bath consisting of a 3 to 20% (say 10%) solution of nitric acid. The action is allowed to proceed for about 14 to 20 hours, the end point being readily found by solubility tests in acetone and by polariscope tests on the basis indicated above. The powder may be agitated in the hydrolyzing liquid during the treatment. While we prefer to use nitric acid, other acids in similarly dilute aqueous solution may be employed. See, for instance, the acids named in the Newton patent cited above. Room temperature can be used.

The hydrolyzed powder is finally washed with water until the acid and catalyst are substantially removed from it. Of course, some of the catalyst is leached out during the hydrolysis operation. Because of the enormous surface relative to the mass of the powder, the washing operation can be performed with a minimum expenditure of time and trouble. The final dried powder is composed of particles of approximately the same order of magnitude as the particles of chloroform-soluble cellulose acetate from which they are derived. They are in a form which is especially susceptible to rapid solution in solvents.

During the hydrolysis the percentage of combined acetic acid in the cellulose acetate diminishes. This reduction is usually not over 6%. For example, when starting hydrolysis with a powder having approximately 54% of combined acetic acid, it will usually have, after the completion of hydrolysis, somewhat more than 48% of combined acetic acid. The preferred range is tween 54% and 48%.

Having thus described our invention, what we claim as new and desire to secure by Letters Patent is:

1. In the process of manufacturing acetone-soluble cellulose acetate, hydrolyzing chloroform-soluble cellulose acetate powder, the sizes of the particles of which are at most of the order of 1/300th of an inch, said particles containing penetrant material, said hydrolysis being carried out in an aqueous solution of an acid until said powder becomes soluble in acetone.

2. In the process of manufacturing acetone-soluble cellulose acetate, hydrolyzing chloroform-soluble cellulose acetate powder, the sizes of the particles of which are at most of the order of 1/300th of an inch, said particles containing residual acetic acid and a condensing agent, said hydrolysis being carried out with an aqueous solution of an acid until said powder becomes soluble in acetone, said hydrolysis being stopped before the specific polariscope rotation of an acetone solution of the powder, measured by mercury green light, becomes positive.

3. In the process of manufacturing acetone-soluble cellulose acetate, hydrolyzing chloroform-soluble cellulose acetate powder, the sizes of the particles of which are at most of the order of 1/300th of an inch, said particles containing residual acetic acid and a milder condensing agent than sulfuric acid, said hydrolysis being conducted in a solution of nitric acid until said powder becomes soluble in acetone.

4. In the process of manufacturing acetone-soluble cellulose acetate, hydrolyzing chloroform-soluble cellulose acetate powder, the sizes of the particles of which are at most of the order of 1/300th of an inch, said particles containing penetrant material, said hydrolysis being carried out with an aqueous solution of nitric acid of 3 to 20% strength until said powder becomes soluble in acetone.

5. In the process of manufacturing acetone-soluble cellulose acetate, hydrolyzing chloroform-soluble cellulose acetate powder, the sizes of the particles of which are at most of the order of 1/300th of an inch, said particles containing residual acetic acid and a condensing agent milder than sulfuric acid, said hydrolysis being carried out with an aqueous solution of nitric acid of 3 to 20% strength until said powder becomes soluble in acetone, said hydrolysis being stopped before the specific polariscope rotation of an acetone solution of the powder, measured by mercury green light, becomes less negative than —2.

6. A hydrolyzed cellulose acetate powder, the particles of which are of the order of 1/300th of an inch, one part by weight of said powder being soluble in four to twelve parts of acetone to form viscous solutions, the specific polariscope rotation of its acetone solution at 25° C., using mercury green light, being negative.

7. A hydrolyzed cellulose acetate having the property of forming from acetone solutions of 7% to 20% strength substantially grainless, strong, transparent, flexible films, said cellulose acetate being insoluble in ethyl alcohol and having a specific polariscope rotation in acetone at 25° C., using mercury green light between —2 and —5.

8. In the process of manufacturing acetone-soluble cellulose acetate, hydrolyzing chloroform-soluble cellulose acetate while in the form of an impalpable powder, the grains of which contain a penetrant material, with an aqueous solution of acid until it becomes soluble in acetone, said hydrolysis being stopped before the specific polariscope rotation of a solution of the treated powder in a mixture of chloroform and ethyl alcohol (in the proportion of 85 parts by volume of the former to 15 parts of the latter) using mercury green light, becomes 7° less negative than the specific rotation of said chloroform-soluble acetate under parallel conditions, both of said rotations being more negative than —18°.

9. In the process of manufacturing acetone-soluble cellulose acetate, hydrolyzing chloroform-soluble cellulose acetate while in the form of an impalpable powder, the grains of which contain acetic acid and a metallic salt which is a milder condensing agent than sulfuric acid, with an aqueous solution of nitric acid of 3 to 20% strength until said powder becomes soluble in acetone, said hydrolysis being stopped before the specific polariscope rotation of a solution of the treated powder in a mixture of chloroform and ethyl alcohol (in the proportion of 85 parts by volume of the former to 15 parts of the latter) using mercury green light, becomes 7° less negative than the specific rotation of said chloroform-soluble acetate under parallel conditions, both of said rotations being more negative than —18°.

Signed at Rochester, New York, this 30th day of June 1926.

RICHARD BAYBUTT.
EDWARD S. FARROW, Jr.